US011295261B2

(12) United States Patent
Douglas

(10) Patent No.: US 11,295,261 B2
(45) Date of Patent: Apr. 5, 2022

(54) FDA COMPLIANT QUALITY SYSTEM TO RISK-MITIGATE, DEVELOP, AND MAINTAIN SOFTWARE-BASED MEDICAL SYSTEMS

(71) Applicant: Ryan Douglas, Stillwater, MN (US)

(72) Inventor: Ryan Douglas, Stillwater, MN (US)

(73) Assignee: DEEPWELL DTX, Las Vegas, NV (US)

( * ) Notice: Subject to any disclaimer, the term of this patent is extended or adjusted under 35 U.S.C. 154(b) by 0 days.

(21) Appl. No.: 16/423,981

(22) Filed: May 28, 2019

(65) Prior Publication Data

US 2019/0362279 A1 Nov. 28, 2019

Related U.S. Application Data

(60) Provisional application No. 62/676,834, filed on May 25, 2018.

(51) Int. Cl.
*G06Q 10/06* (2012.01)
*G06F 16/22* (2019.01)
(Continued)

(52) U.S. Cl.
CPC ..... *G06Q 10/0635* (2013.01); *G06F 16/2282* (2019.01); *G06F 16/252* (2019.01);
(Continued)

(58) Field of Classification Search
CPC ......... G06Q 10/0635; G06Q 10/06395; G06Q 10/0637; G06Q 10/06375; G06F 16/907
See application file for complete search history.

(56) References Cited

U.S. PATENT DOCUMENTS 7,440,905 B2 10/2008 Ellis et al.
7,698,148 B2 4/2010 Lavu et al.
(Continued)

FOREIGN PATENT DOCUMENTS

WO WO-2017127818 A1 * 7/2017 ......... G06Q 30/0201

OTHER PUBLICATIONS

Krus, D., & Grantham, K. (2011). A step toward risk mitigation during conceptual product design: Component selection for risk reduction. Journal of Failure Analysis and Prevention, 11(4), 432-445. (Year: 2011).*

*Primary Examiner* — William S Brockington, III
(74) *Attorney, Agent, or Firm* — Craige Thompson; Thompson Patent Law; Timothy D. Snowden

(57) ABSTRACT

Apparatus and associated methods relate to a risk trace matrix engine for managing database associations, in a quality management system (QMS), between risk mitigations and features of a system having a risk-based profile. In an illustrative example, metadata may be created to associate risk mitigations with elements of a product and then metadata may be stored in a database during the design or operating lifecycle of the product, for example. The engine may dynamically build one or more trace matrices for the product design, each matrix associating risk mitigations to elements of the product design documentation. In response to any modifications that may relate to the component's specifications, for example, the engine may retrieve associated metadata and generate notifications prompting for user verification. In various implementations, such engines may advantageously reduce the risk by automatically generating traceability via a matrix of associations between features and components, which may be hardware and/or software components.

17 Claims, 4 Drawing Sheets

(51) Int. Cl.
*G06F 16/25* (2019.01)
*G06F 16/907* (2019.01)

(52) U.S. Cl.
CPC ..... *G06F 16/907* (2019.01); *G06Q 10/06375* (2013.01); *G06Q 10/06395* (2013.01)

(56) References Cited

U.S. PATENT DOCUMENTS

| | | | |
|---|---|---|---|
| 2004/0098300 A1 | 5/2004 | Karwatowski et al. | |
| 2012/0254710 A1* | 10/2012 | Flanagan | G06Q 10/0631 715/202 |
| 2013/0006701 A1* | 1/2013 | Guven | G06Q 10/0635 705/7.28 |
| 2014/0081700 A1* | 3/2014 | Mehta | G06Q 50/184 705/7.28 |
| 2015/0032643 A1* | 1/2015 | Loewen | B64F 5/60 705/305 |
| 2015/0134398 A1* | 5/2015 | Xiao | G06Q 10/0635 705/7.28 |
| 2015/0356477 A1* | 12/2015 | Milkman | G06Q 10/0633 705/7.27 |
| 2018/0032639 A1* | 2/2018 | Nakagawa | G06F 30/00 |
| 2019/0026675 A1* | 1/2019 | McKibbin | G06Q 10/06393 |

\* cited by examiner

FDA COMPLIANT QUALITY SYSTEM TO RISK-MITIGATE, DEVELOP, AND MAINTAIN SOFTWARE-BASED MEDICAL SYSTEMS

CROSS-REFERENCE TO RELATED APPLICATIONS

This application claims the benefit of U.S. Provisional Application Ser. No. 62/676,834, titled "RISK TRACE MATRIX FOR QUALITY MANAGEMENT SYSTEMS," filed by Ryan Douglas, on May 25, 2018.

This application incorporates the entire contents of the foregoing application(s) herein by reference.

TECHNICAL FIELD

Various embodiments relate generally to automated device risk mitigation systems and methods.

BACKGROUND

Medical device development, manufacturing and ongoing post-market support are required by the FDA to be managed in a risk-based environment. Hazards of the treatment induced by the design, use and or failure of the device are required to be examined and product requirements developed, verified and validated to prove mitigation of those risks were completed to a maximum level practicable.

SUMMARY

Apparatus and associated methods relate to a risk trace matrix engine for managing database associations, in a quality management system (QMS), between risk mitigations and features of a system having a risk-based profile. In an illustrative example, metadata may be created to associate risk mitigations with elements of a product and then metadata may be stored in a database during the design or operating lifecycle of the product, for example. The engine may dynamically build one or more trace matrices for the product design, each matrix associating risk mitigations to elements of the product design documentation. In response to any modifications that may relate to the component's specifications, for example, the engine may retrieve associated metadata and generate notifications prompting for user verification. In various implementations, such engines may advantageously reduce the risk by automatically generating traceability via a matrix of associations between features and components, which may be hardware and/or software components.

Various embodiments may provide one or more advantages. For example, new components introduced to a design may be automatically associated with metadata associated with previous components that may have provided the same function. Associations may be made between design elements and various engineering documentation, such as, by way of example and not limitation, program code modules, hardware, design documents, schematics, test plans, and bills of material. Substitute design elements (e.g., code, hardware components or subsystems) may be introduced over the lifecycle of the system with reduced risk as pre-existing risk information is associated, without reliance on institutional memory of critical personnel, for example. Traceability may be dynamically maintained, which may reduce the cost and/or need for non-essential test verification, and/or mitigate the risk by providing all associated risk profile metadata relevant to a component of interest.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Risk management may be done during the product development process; however, during post-market (post-design engineering) portions of the product life cycle there can be considerable difficulty to ensure that changes to the product are closely monitored for impact to risk and traceability to all mitigations are maintained. It is also very difficult to retain all information tied to design intent and understand how multiple parts work together in the mitigation of risk.

Figure 1:
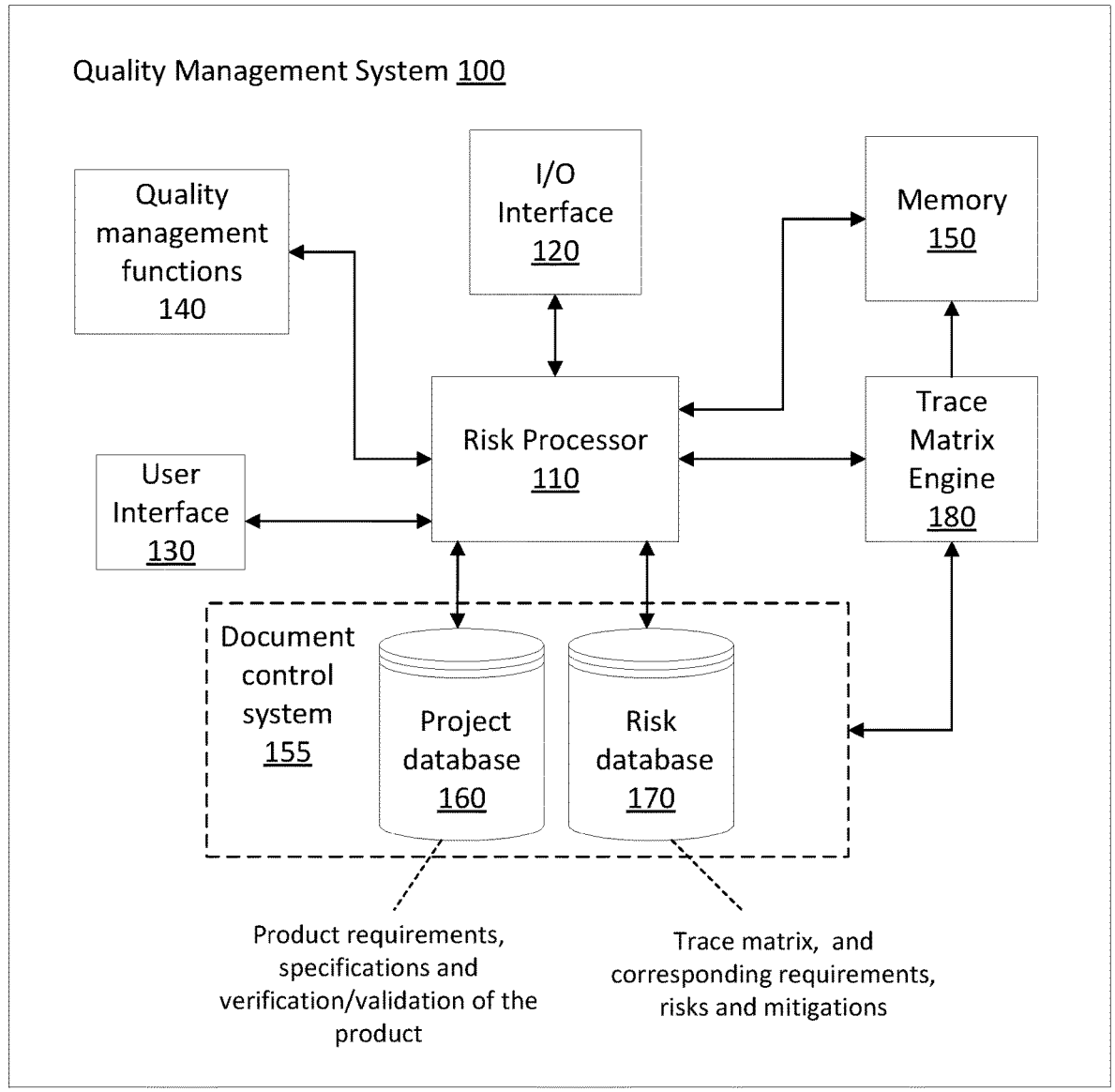
FIG. 1 depicts an architecture of an exemplary quality management system (QMS).

FIG. 1 depicts an architecture of an exemplary quality management system (QMS). In this depicted example, a quality management system (QMS) 100 includes a risk processor 110 (e.g., a processor or a controller, for example). The risk processor 110 is configured to perform operations. In some embodiments, the risk processor 110 may determine risk levels and perform corresponding risk alleviation control.

The risk processor 110 is coupled to receive and/or transmit data (e.g., user command signal) through an I/O interface 120. A user or a designer may transfer data from a flash drive to the QMS 100 or download data in the QMS 100 to the flash drive. The risk processor 110 is also coupled to a user interface 130. The user interface 130 may be a graphical user interface (GUI). A user may input commands through the user interface 130. The user interface 130 may also display information under control of the risk processor 110. The risk processor 110 is coupled to a quality management function block 140 which includes a number of quality management functions. Trace matrix and corresponding requirements, risks and mitigations may be released as documents through the quality management function block 140.

The risk processor 110 is also coupled to memory 150 (e.g., non-volatile memory (NVM)). The memory 150 may be used to store configuration profiles and/or network settings of the system. The memory 150 may also include look-up tables (LUTs) to store one or more parameters/operations associated with one or more predetermined criteria. The predetermined criteria may include criteria corresponding to environmental parameters and monitored equipment status parameters.

The memory 150 may include program instructions to be performed by the risk processor 110. For example, the memory 150 may store instructions that, when executed by the risk processor 110, cause the risk processor 110 to perform operations to update existing specifications of product objects related to a product. In some embodiments, the operations may include receiving data from a document control system 155 that stores all documents related to the product. For example, the document control system 155 may include a project database 160 and a risk database 170. The project database 160 may store product (e.g., medical device) requirements, specifications, and verification/validation of the product. The risk database 170 may store trace matrix and corresponding requirements, risks and mitigations of the product. These documents are "flat" and not directly linked to ongoing product/part/component specifications making risk-based decision making and ongoing traceability difficult.

The QMS 100 also includes a trace matrix engine 180. The trace matrix engine 180 is configured to receive data from the project database 160 and receive data from the risk database 170 and generate a data structure (e.g., metadata) that associates each part of the product to at least a corresponding related risk and/or mitigation. The generated data structure may be also stored in memory 150. In some embodiments, the generated data structure may be stored in a different memory.

For post-product risk management, sometimes a product objective (e.g., an electrical component of a medical device) may be replaced for many different reasons. For example, an original electrical component in the product may be replaced by a new generation of the electrical component to upgrade the product. An original electrical component in the product may be replaced by a different electrical component as the previous electrical component is no longer available in the market. An original electrical component in the product may be also replaced to reduce the cost of the product. Designers may not be able to remember all the functions that the original electrical component involved to form the risk-controlled product. By including a trace matrix engine 180 to generate metadata that associates each project objective with its corresponding functions and/or influences (e.g., mitigations and/or risks), the user/designer may be reminded all relative information when he wants to make a change to the product objective. Thus, risk management of post-product change may be timely performed, and new and comprehensive risk management may be eliminated or reduced.

Figure 2:
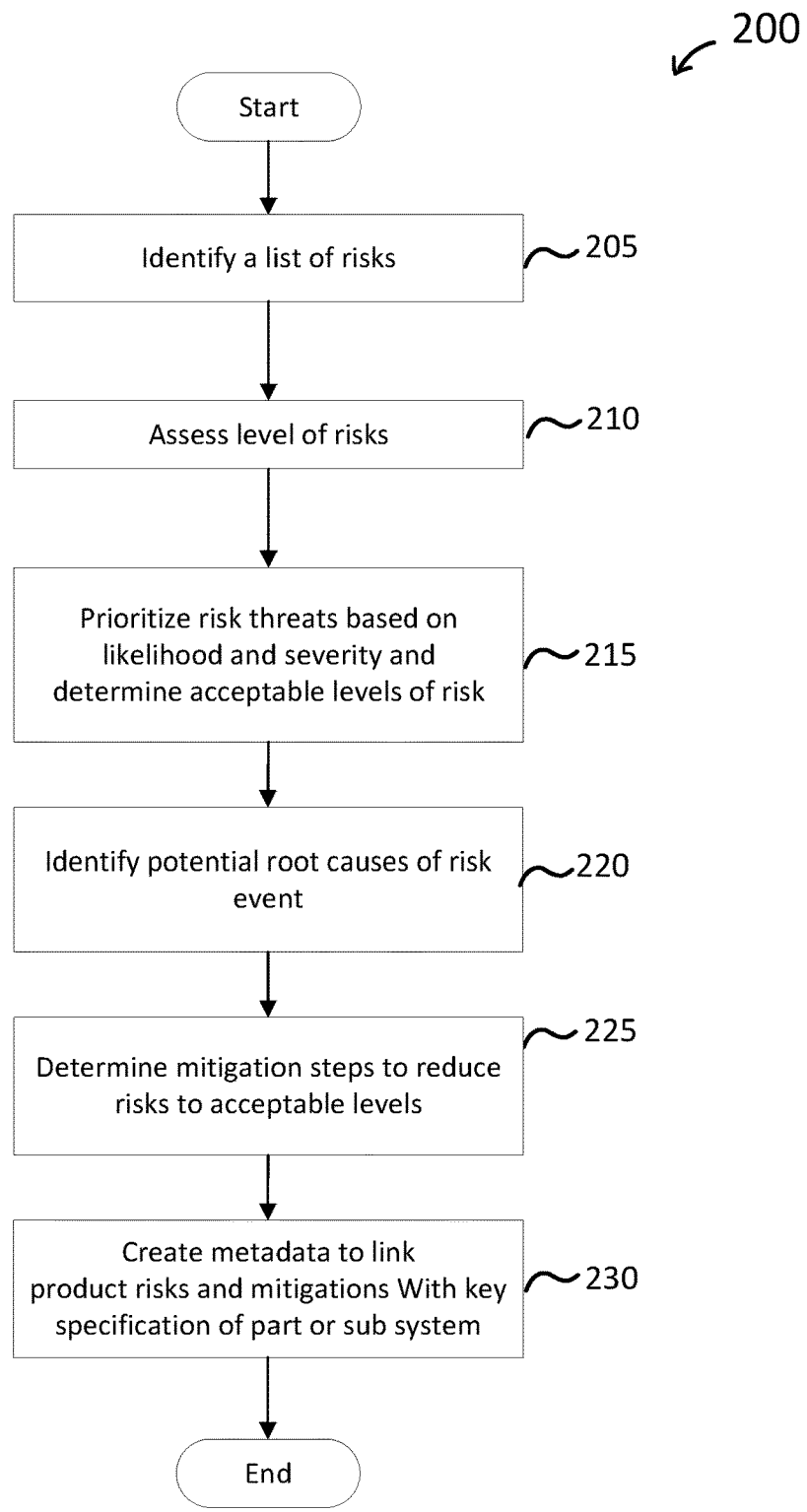
FIG. 2 depicts a flow chart of an exemplary method to perform risk management during product development process.

FIG. 2 depicts a flow chart of an exemplary method to perform risk management during product development process. A method 200 includes, at 205, identifying a list of potential risks related to a product (e.g., a medical device). The method 200 may also include describing events that could negatively impact operations of the product. The method 200 also includes, at 210, assessing levels of each risk in the list. For example, a designer may consider possible consequences should a risk event occur. The method 200 also includes, at 215, prioritizing risk threats based on likelihood and severity and determining acceptable levels of risk.

The method 200 also includes, at 220, identifying potential root causes of each risk event in the list. For example, a cell phone may explode because of a defect of the battery in the cell phone. The method 200 also includes, at 225, determine mitigation steps to reduce risks to acceptable levels. For example, a resistor may be used to tolerate extra energy in the battery to mitigate the risk of explosion. The method 200 also includes, at 230, creating a data structure (e.g., metadata) to link product objectives in specifications (e.g., key specifications of a part or a sub system) with the influences and/or functions of the product objectives (e.g., product risks and mitigations). When parts or sub systems are changed, the changes to the key specifications may trigger inquiries against the previously created risk mitigations and ensure changes are not triggering new or increased risk. If new or increased risk is triggered, then proper evaluation and new risk mitigations may be performed, risk matrix may be updated and new part associations may be created to keep the risk mitigation system updated and accurate. For example, to form a cell phone, bills of materials (BOM) may be generated. The BOMs may include, for example, names, part numbers, manufacturers of each electrical/physical components in the cell phone. The trace matrix engine 180 receives the BOMs and risk trace matrix from the document control system 155 and generates metadata to correlate each electrical/physical components with respective corresponding risks and/or mitigations. Thus, when a component is going to be changed, all relative information of the component is available for the designer. Thus, a comprehensive way to perform risk management is introduced.

Figure 3:
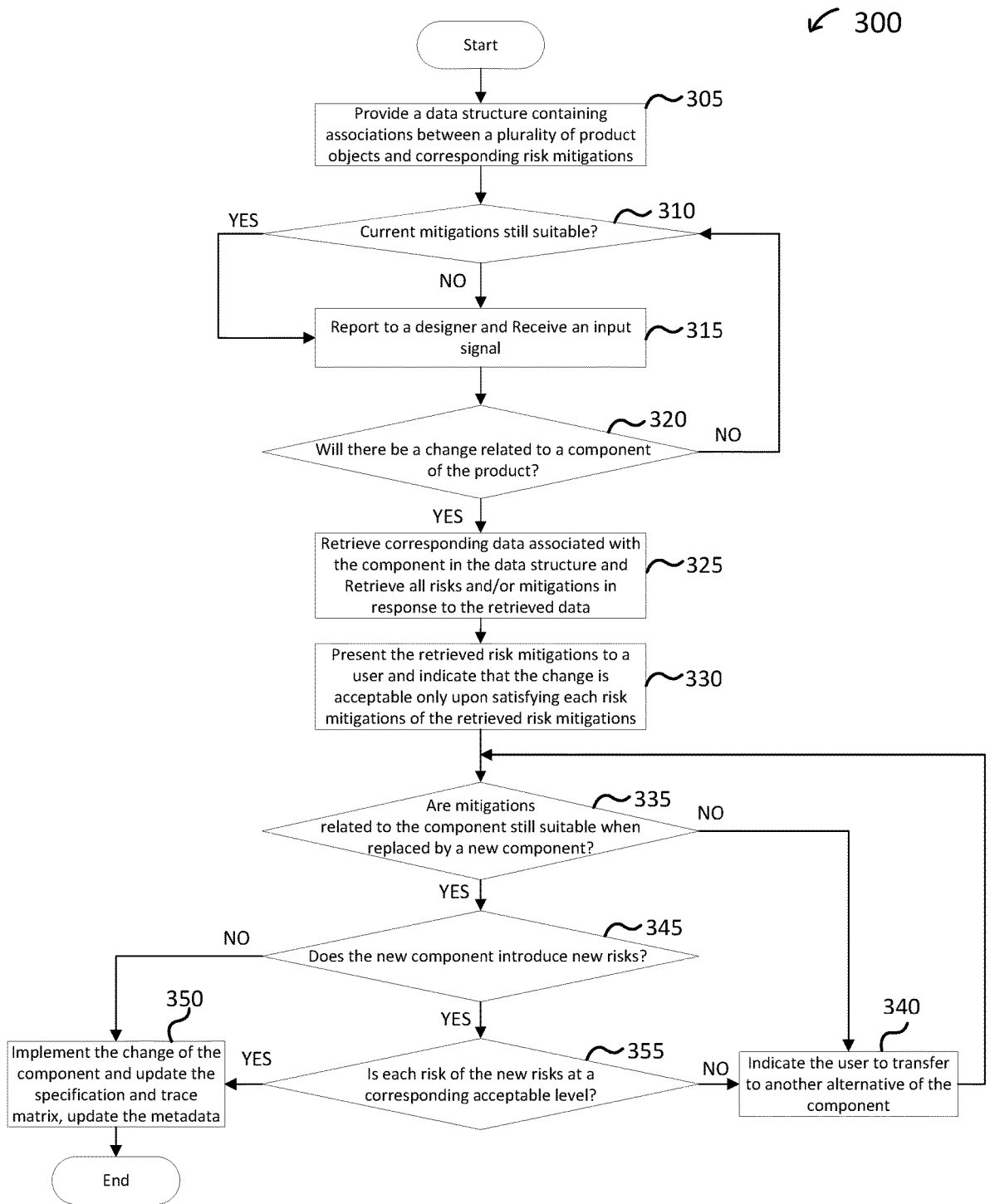
FIG. 3 depicts a flow chart of an exemplary method to perform risk management after product development process.

FIG. 3 depicts a flow chart of an exemplary method to perform risk management after product development process. A method 300 includes, at 305, providing a data structure (e.g., metadata) containing associations between a plurality of product objects and corresponding risk mitigations. The data structure may be obtained by the method disclosed in FIG. 2. The method 300 also includes checking whether any altered product specifications are tied to risk mitigations—if yes, new analysis and ultimately new associations may be triggered. More specifically, the method 300 also includes at 310, keeping monitoring (e.g., by a designer or a processor, for example) current mitigations to see whether those mitigations are still effective. If one or more current mitigations are no longer effective, then, at 315, the risk processor 310 reports (e.g., by executing a predetermined operation) the status to a designer. And the designer determines, at 320, whether to change a product objective (e.g., a component) of the product and input the decision to the processor 110. If at 310, the current mitigations are still effective, the processor 110 also reports this status to the designer to see whether the designer wants to upgrade the project by changing a product objective.

If at 320, the designer decides there's no change to each product objective, then the method loops back to 310. If the designer decides to change one or more product objectives, then, the designer may input the product objectives to be changed to the QMS 100. By receiving the user input, for example, at 325, the processor 110 retrieves (e.g., from the memory 150) all risks and/or mitigations associated with the component, and, at 330, instructs a user interface (e.g., the user interface 130) to present all risks and/or mitigations associated with the component and indicate that the change is acceptable only upon satisfying each risk mitigations of the retrieved risk mitigations.

At 335, the processor then indicates the designer to determine whether mitigations related to the product objective are still suitable when replaced by a new product objective (e.g., a new component). For example, when an old resistor is replaced by a new resistor that's different from the old resistor, the designer may determine whether the mitigation to reduce the explosion is still available. If current mitigations are no longer suitable, then, at 340, the QMS indicates the designer to find another alternative of the product objective, and the method loops back to 335.

If current mitigations are still suitable, then, at 345, the processor 110 may indicate the designer to decide whether the new product objective may introduce new risks. If no new risks are introduced, then, at 350, the processor 110 may indicate the designer to implement the change of the product objective and the processor 110 may then update the specification and trace matrix in the document control system 155. The trace matrix engine 180 may also update related metadata. If new risks are introduced, then, at 355, the processor 110 may indicate the designer to decide whether the new risks are at corresponding acceptable levels. If all the new risks are at or below corresponding acceptable levels, then the method may loop back to 350. If not all the new risks are at corresponding acceptable levels, then the method may loop back to 340. By retrieving metadata related to related product objectives, a designer may be reminded of every aspect of the performance and function of the product objective, thus, risks of change for post-product design may be well monitored and controlled. In some embodiments, if a component has changed to different specifications, one way to make sure that the change does not introduce new risks may be to rerun some portion of the design verification testing. After rerunning the related portion of the design verification testing, a test report may be generated, and the generated test report may also be linked to the changed part via the risk trace matrix. The linkage may be useful for future reference if there is a subsequent product issue or if the component will be substituted multiple times.

Figure 4:
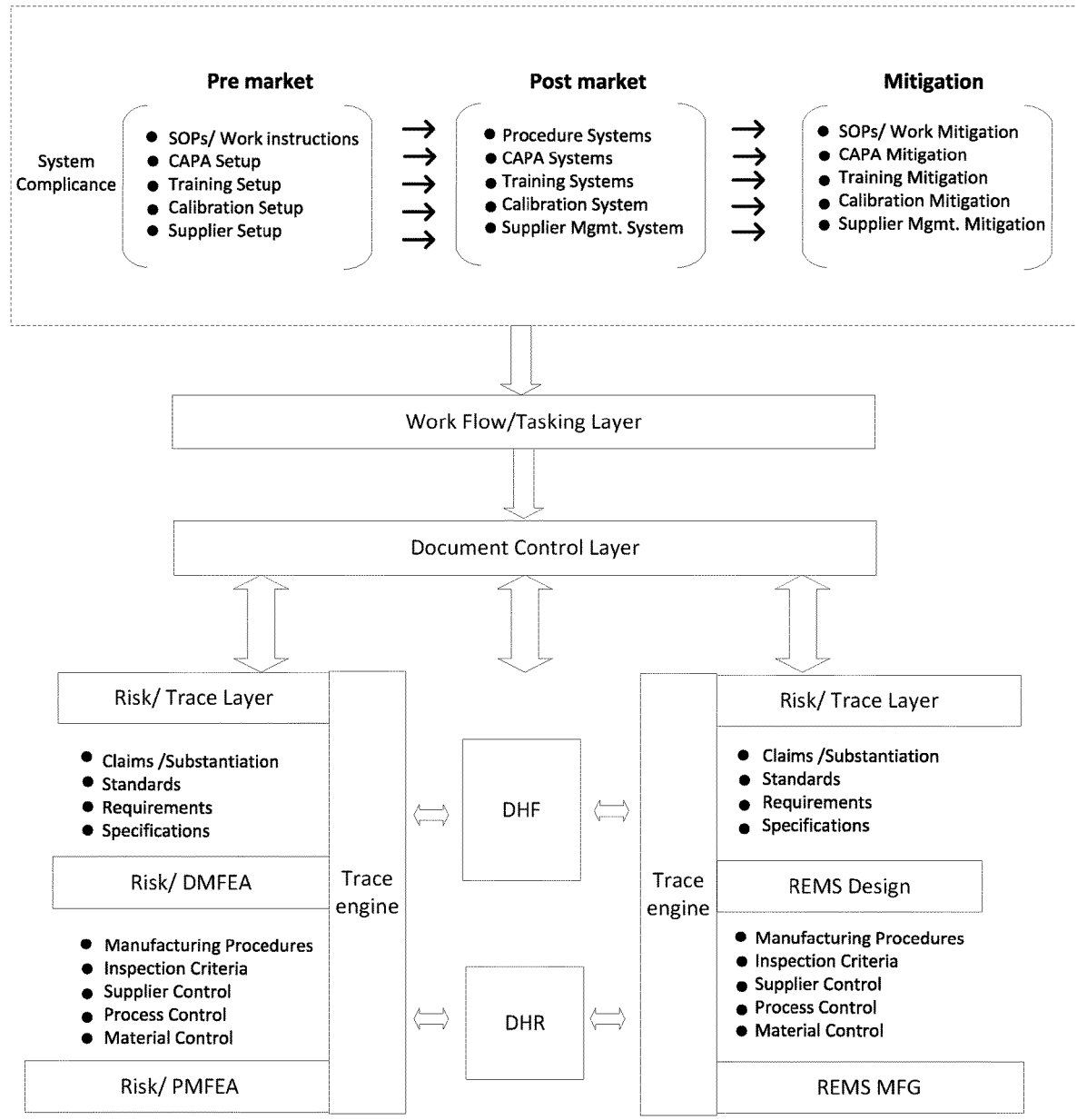
FIG. 4 depicts a flow diagrammatic view of an exemplary risk-based vertically-traced QMS.

FIG. 4 depicts a flow diagrammatic view of an exemplary risk-based vertically-traced QMS. The method described with reference to FIG. 3 may also be applied to risk mitigation and management of software code for a medical device. Each Software module may be interrelated to the portion of the risk assessment and traced for mitigations. When software updates occur, those modules effected may point back to the risk mitigations and bring the developer through a series of questions to determine if there has been impact to the products safety system and may even drive the level of software testing required to complete the assessment of function and subsequently update the risk assessment.

Various implementations may take the requirements gathering, risk assessment and association to the device specifications from documents that are managed in the system to application of the system operating as a layer within or connected to the QMS. These design history file elements are interconnected through a trace matrix engine that relatedly associates these design inputs (requirements) to the design outputs (specifications) through the engine which creates metadata denoting the paths of association between these design history file elements and their corresponding mitigations within the system.

The result is a dynamically linked group of specifications associated with the risk matrix by the trace engine. As such, each time an individual part or specification is evaluated for change or other product life cycle activities, the risk analysis may be easily referenced and updated. This linkage ensures risk-based decision making is used during the entire life cycle and especially during change process and ensures the risk matrix and traceability is maintained in the post-market management of the device history file.

The resulting metadata from the trace engine can fuel reporting and ongoing linkages that quickly allow a device engineer, product manager or quality professional to understand how the part was designed, modified, tested and released to fulfill its portion of product function and or mitigate device/treatment risk.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an exemplary system (e.g., the QMS 100) has been described with reference to FIG. 1, other implementations may be deployed in other industrial, scientific, medical, commercial, and/or residential applications. Although particular features of an architecture have been described, other features may be incorporated to improve performance. For example, caching (e.g., L1, L2, etc. . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades, etc. . . . ), and the like. One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of the invention by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In one exemplary aspect, a method includes (a) providing a data structure containing associations between a plurality of product objects and corresponding risk mitigations, (b) in response to receiving an input signal that identifies one original product object of the plurality of product objects to be changed, retrieving, by a processor, data that maps the product object to corresponding risk mitigations from the data structure, (c) retrieving, by the processor, the corresponding risk mitigations, and, (d) presenting the retrieved risk mitigations to a user and indicating, by a user interface, that the change is acceptable only upon satisfying each risk mitigations of the retrieved risk mitigations.

In some embodiments, the risk mitigations may include a plurality of risks and a plurality of corresponding mitigations of each of the plurality of risks. In some embodiments, the method may also include implementing the changed product object and updating specifications and risk mitigations of the changed product objects. In some embodiments, the method may also include updating data related to the changed product object in the data structure. In some embodiments, the data structure may include metadata.

In some embodiments, the method may also include determining, whether a corresponding risk mitigation which implementing the original product object suitable to the changed product object. In some embodiments, the method may also include providing a format to determine whether the changed product object introduces new risks. In some embodiments, the product object may include a specification of at least a portion of a product. In some embodiments, the product object may include source code. In some embodiments, the method may also include storing the data structure in memory.

In another exemplary aspect, a system includes (a) a document control system containing data which identifies design specifications of a plurality of product objects and data which identifies mitigation steps to reduce potential risks of the product to acceptable levels, a trace matrix engine configured to generate a data structure containing associations between the plurality of product objects and corresponding mitigations, (c) a memory configured to store the data structure, and, (d) a processor in communication with the document control system and the memory, and the processor is operable to: (d1) retrieve, in response to receiving an input signal that identifies one original product object of the plurality of product objects to be changed, data that maps the product object to corresponding risk mitigations from the data structure, and, (d2) retrieve the corresponding risk mitigations from the document control system.

In some embodiments, the system may also include a user interface configured to (a) present the retrieved risk mitigations to a user and (b) indicate that the change is acceptable only upon satisfying each risk mitigation of the retrieved risk mitigations in response to receiving a command signal from the processor. In some embodiments, the risk mitigations may include a plurality of risks and a plurality of corresponding mitigations of each of the plurality of risks. In some embodiments, the processor may be further operable to implement the changed product object and update specifications and risk mitigations of the changed product objects. In some embodiments, the processor may be further operable to instruct the trace matrix engine to update data related to the changed product object in the data structure. In some embodiments, the data structure may include metadata. In some embodiments, the processor may be further operable to determine whether a corresponding risk mitigation which implementing the original product object suitable to the changed product object. In some embodiments, the processor may be further operable to determine whether the changed product object introduces new risks. In some embodiments, the product object may also include a specification of at least a portion of a product. In some embodiments, the document control system may also include a first database contains data related to design requirements and data specifications of the product objects and a second database contains data related to risk mitigations of the product objects.

In some implementations, each QMS 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server. In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the QMS 100 may communicate using suitable communication methods, equipment, and techniques. For example, the QMS 100 may communicate with compatible devices (e.g., devices capable of transferring data to and/or from the QMS 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer-implemented method performed by at least one processor to automatically perform risk management for medical software, the method comprising:
   (a) receiving an input signal that identifies a proposed change to a first product object of a plurality of product objects comprising source code and stored in a data structure containing risk trace matrix (RTM) associations, each RTM association comprising a digital metadata structure defining a relationship at least between one of the plurality of product objects, and corresponding treatment risk mitigations;
   (b) in response to receiving the input signal, retrieving, by the at least one processor from the data structure, a first RTM association corresponding to the first product object, the first RTM association being one of the RTM associations in the data structure and comprising a first metadata structure defining a predetermined relationship between the first product object and a set of risk mitigations corresponding to the first product object;
   (c) retrieving, by the at least one processor in response to retrieving the first RTM association, each of the set of risk mitigations;
   (d) generating, by the at least one processor for display on an electronic display device an in response to retrieving the set of risk mitigations, a user interface presenting the set of risk mitigations to a user as associated with the first product object and indicating to the user, by the user interface, that the proposed change is acceptable only upon satisfying each of the set of risk mitigations;
   (e) when a signal is received indicating that any of the set of risk mitigations is not suitable if the proposed change is implemented, automatically generating an indication to the user that the proposed change is automatically rejected;
   (f) when the set of risk mitigations is suitable if the proposed change is implemented, implementing the proposed change to the first product object and updating at least one specification associated with the first product object and at least one of the set of risk mitigations associated with the first product object; and,
   (g) updating data related to the first product object in the first metadata structure.

2. The method of claim 1, wherein at least one of the set of risk mitigations comprises a plurality of risks and at least one mitigation corresponding to each of the plurality of risks.

3. The method of claim 1, wherein if the set of risk mitigations is not suitable if the proposed change is implemented, then reject the proposed change.

4. The method of claim 1, further comprising: in response to the proposed change, determining impact on a safety system of the first product object based on at least one input from a developer regarding the proposed change.

5. The method of claim 1, further comprising:
   if the proposed change introduces a new risk, then requiring an indication of acceptability of the new risk; and,
   if the indication of acceptability indicates that a risk level associated with the new risk is not acceptable, then generating the indication that the proposed change is automatically rejected.

6. The method of claim 1, wherein the first product object comprises a specification of at least a portion of a product.

7. The method of claim 1, wherein the first product object comprises at least one of: a software component, and a digital component.

8. The method of claim 1, further comprising:
   in response to the proposed change not being acceptable, generate an indication to transfer to an alternative product object.

9. The method of claim 1, further comprising:
   in response to a rejection of the proposed change, identify at least one mitigation step which may be implemented such that the proposed change is acceptable.

10. A system, comprising:
   a document control system containing, for each of a plurality of product objects, design specifications and risk mitigations to reduce potential risks of each of the plurality of product objects to acceptable levels;
   a trace matrix engine configured to generate a data structure containing a plurality of risk trace matrix (RTM) associations between the plurality of product objects and the risk mitigations;
   a memory configured to store the data structure; and,
   a processor in communication with the document control system and the memory, the processor being operable to:
      (a) retrieve from the data structure, in response to receiving an input signal that identifies a first product object of the plurality of product objects and a proposed change to the first product object, a first RTM association of the plurality of RTM associations, the first RTM association comprising a digital metadata structure defining a relationship at least mapping the first product object to a first set of risk mitigations;

(b) retrieve each of the first set of risk mitigations from the document control system based on the first RTM association;

(c) in response to determining that at least one of a first set of conditions is true, the conditions comprising: (i) at least one of the first set of risk mitigations is not suitable for the proposed change, and (ii), the proposed change introduces a new risk, automatically refuse implementation of the proposed change and automatically generate an indication indicating that the proposed change is automatically refused and requiring risk assessment; and, (d) if the first set of risk mitigations is suitable if the proposed change is implemented, implement the proposed change to the first product object, update at least one specification associated with the first product object and at least one of the first set of risk mitigations associated with the first product object, and update the digital metadata structure such that the proposed change is associated with the first set of risk mitigations.

11. The system of claim 10, further comprising:

a user interface configured to (a) present the first set of risk mitigations to a user and (b) indicate that the proposed change is acceptable only upon satisfying each risk mitigation of the first set of risk mitigations, in response to receiving a command signal from the processor.

12. The system of claim 10, wherein each of the first set of risk mitigations comprises a plurality of risks and a plurality of corresponding mitigations of each of the plurality of risks.

13. The system of claim 10, wherein the processor is further operable to instruct the trace matrix engine to update data related to the first product object in the data structure.

14. The system of claim 10, wherein the processor is further operable to determine whether the proposed change to the first product object introduces new risks.

15. The system of claim 10, wherein the first product object comprises a specification of at least a portion of a product.

16. The system of claim 10, wherein the document control system comprises a first database that contains data related to design requirements and data specifications of the plurality of product objects and a second database that contains data related to the risk mitigations of the plurality of product objects.

17. The system of claim 10, wherein:

the first product object comprises at least one component of medical software, the at least one component comprising at least one of: a software component, and a digital component, the first set of risk mitigations comprises mitigations of treatment risks associated with the at least one component, and, the processor is further operable to, in response to the proposed change, present a series of questions, and determine from at least one response to the series of questions an impact on a safety system of the first product object.

* * * * *